（12) United States Patent
Longenecker et al.

(10) Patent No.: US 12,311,808 B2
(45) Date of Patent: May 27, 2025

(54) QUICK-ACTING BELT TENSIONER FOR A CHILD SAFETY SEAT

(71) Applicant: ARTSANA USA, INC., Lancaster, PA (US)

(72) Inventors: Michael L. Longenecker, Lancaster, PA (US); Matthew J. Ransil, Richland, PA (US); Michael S. Degrace, Red Lion, PA (US)

(73) Assignee: Artsana USA, Inc., Lancaster, PA (US)

( * ) Notice: Subject to any disclaimer, the term of this patent is extended or adjusted under 35 U.S.C. 154(b) by 223 days.

(21) Appl. No.: 18/181,855

(22) Filed: Mar. 10, 2023

(65) Prior Publication Data

US 2023/0294573 A1    Sep. 21, 2023

Related U.S. Application Data

(60) Provisional application No. 63/321,382, filed on Mar. 18, 2022.

(51) Int. Cl.
    *B60N 2/28*    (2006.01)
(52) U.S. Cl.
    CPC .................................. *B60N 2/2806* (2013.01)
(58) Field of Classification Search
    CPC .................................................... B60N 2/2806
    See application file for complete search history.

(56) References Cited

U.S. PATENT DOCUMENTS

| | | |
|---|---|---|
| 5,839,789 A | 11/1998 | Koledin |
| 6,047,451 A | 4/2000 | Berger et al. |
| 6,105,211 A | 8/2000 | Berger |
| 6,247,208 B1 | 6/2001 | Creech |
| 6,273,353 B1 | 8/2001 | Berger |
| 6,279,847 B1 | 8/2001 | Berger |
| 6,539,590 B2 | 4/2003 | Ziv |
| 7,029,068 B2 | 4/2006 | Yoshida |
| 7,059,676 B2 | 6/2006 | McNeff |
| 8,434,821 B2 | 5/2013 | Gibree |

(Continued)

FOREIGN PATENT DOCUMENTS

NO    316064 B1    12/2003

OTHER PUBLICATIONS

EP Search Report, Aug. 9, 2023, 7 pgs.

*Primary Examiner* — Anthony D Barfield
(74) *Attorney, Agent, or Firm* — Saxton & Stump, LLC

(57) ABSTRACT

A quick acting belt tensioning mechanism for securing a child safety seat into a vehicle having a tensioning member with a hook-like engagement structure rotatably mounted on the safety seat adjacent to a belt path for a vehicle seat belt. Engaging the seat belt in the engagement structure and rotating the tensioning member by movement of the lever tensions the seat belt by wrapping the seat belt around the tensioning member. The lever is slideably disposed on the tensioning member to close the opening of the hook-like structure and prevent disengagement of the seat belt therefrom and to inhibit rotation of the tensioning member to the tensioned position unless the lever is properly positioned. A latching mechanism is provided to restrain the tensioning member and lever in the tensioned and closed position. The seat shell and lever may include structures to further constrain seat belt tensioning unless the lever is properly positioned.

17 Claims, 8 Drawing Sheets

(56) References Cited

U.S. PATENT DOCUMENTS

| | | |
|---|---|---|
| 8,573,695 B2 | 11/2013 | Van Greer et al. |
| 8,845,022 B2 | 9/2014 | Strong et al. |
| 8,973,991 B2 | 3/2015 | Wuerstl |
| 9,187,016 B2 | 11/2015 | Strong et al. |
| 9,499,074 B2 | 11/2016 | Strong et al. |
| 9,586,504 B2 | 3/2017 | Strong et al. |
| 9,963,051 B2 | 5/2018 | Strong et al. |
| 10,696,192 B2 * | 6/2020 | Harmes, V .......... B60N 2/2872 |
| 11,117,498 B2 | 9/2021 | Strong et al. |
| 11,299,074 B2 | 4/2022 | Goare et al. |
| 2013/0119732 A1 | 5/2013 | Wuerstl et al. |
| 2016/0311345 A1 | 10/2016 | Morgenstern |
| 2017/0158094 A1 | 6/2017 | Strong et al. |
| 2017/0217339 A1 | 8/2017 | Strong et al. |
| 2022/0048413 A1 | 2/2022 | Strong et al. |
| 2022/0097578 A1 | 3/2022 | Thenander et al. |
| 2022/0105836 A1 | 4/2022 | Messner et al. |
| 2022/0194270 A1 | 6/2022 | Goare et al. |

* cited by examiner

QUICK-ACTING BELT TENSIONER FOR A CHILD SAFETY SEAT

CROSS-REFERENCE TO RELATED APPLICATIONS

This application claims priority to U.S. Ser. No. 63/321,382, entitled "QUICK-ACTING BELT TENSIONER FOR A CHILD SAFETY SEAT" filed Mar. 18, 2022, the disclosure of which is incorporated herein by reference in its entirety.

FIELD OF THE INVENTION

The present disclosure is generally directed to the field of child safety seats for use in vehicles, and, more particularly to a quick acting belt tensioning mechanism that tensions the vehicle safety belts to properly anchor the safety seat in the vehicle.

BACKGROUND OF THE INVENTION

Children's safety seats installed in vehicles have made automobile travel substantially safer for children. Realization of these safety benefits relies on proper installation and tensioning of the vehicle seat belts to securely anchor the safety seat in the vehicle. Many parents discover the process of properly installing child safety seats to be difficult and often. Vehicle seat belts typically comprise lap and shoulder belt portions with routing optimized to restrain an adult or larger child siting in the vehicle seat. Belt routing adapted to secure a safety seat in the vehicle seat generally complicates the belt installation and tensioning process.

What is needed is a quick acting belt tensioning mechanism for a child safety that simplifies the process of anchoring the seat into the vehicle while providing a simple and reliable mechanism to properly tension the vehicle seat belt and properly secure the safety seat into the vehicle. Other features and advantages will be made apparent from the present specification. The teachings disclosed extend to those embodiments that fall within the scope of the claims, regardless of whether they accomplish one or more of the aforementioned needs.

SUMMARY OF THE INVENTION

Accordingly, the present invention, in any of the embodiments described herein, may provide one or more of the following advantages:

It is an object of the present invention to provide a quick acting belt tensioning mechanism for securing a child safety seat into a vehicle comprising a tensioning member with a hook-like engagement structure rotatably disposed on a shell of the safety seat and rotatable between generally opposing tensioned and released positions, and a lever slidably disposed on the engagement structure between generally opposing open and closed position and operably connected to the engagement structure to effect rotational movement thereof. Securing the safety seat to the vehicle requires directing the vehicle seat belt through openings in the safety seat shell allowing the vehicle seat belt to be directed through the seat shell adjacent to the tensioning member and engaged in the hook-like engagement structure of the tensioning member while the tensioning member is release and the lever opened. Once the vehicle seat belt is attached to a latching connector in the vehicle, the tensioning mechanism is operated by sliding the lever to the closed position and then rotating the tensioning member from the released position to the tensioned position by moving the lever. Slack in the vehicle seat belt is reduced as the seat belt is wrapped around the engagement structure as the tensioning member is rotated.

It is a further object of the present invention to provide a quick-acting belt tensioning mechanism for securing a child safety seat into a vehicle having a rotatable tensioning member with a hook-like engagement structure and a lever with slidably disposed for axial movement on the tensioning member. The engagement structure includes a belt engagement path substantially surrounded by the structure and an engagement opening created by the open mouth of the hook. The lever may be moved so the engagement opening is unimpeded, allowing insertion of the vehicle safety belt through the engagement opening or to block the engagement opening thereby preventing removal of the vehicle safety belt from the engagement path dependent upon the axial position of the lever. The lever when in the closed position blocks the engagement opening of the engagement structure thereby retaining the vehicle belt within the engagement structure.

It is a further object of the present invention to provide a quick acting belt tensioning mechanism for securing a child safety seat into a vehicle having a rotatable tensioning member rotated by a lever and further comprising a latching mechanism with a moveable latch member engageable with a fixed latch plate when the lever tensioning member is rotated to the tensioned position while the lever is in the closed position to restrain the tensioning member in the tensioned position.

It is a still further object of the present invention to provide a quick acting belt tensioning mechanism for securing a child safety seat into a vehicle having a position limiting structure configured to receive the lever when rotating the tensioning member toward the tensioned position only when the lever is in the closed position. The positioning limiting structure may take the form of a recessed portion in the shell of the safety seat in which the tensioning member and lever are partially disposed. Blocking structures may also be provided on the lever to limit lever movement to a desired sequence for tensioning the vehicle seat belt.

It is another object of the present invention to provide a quick acting belt tensioning mechanism for securing a child safety seat into a vehicle having a latching mechanism to maintain the tensioning member and lever in at least one preferred position. The at least one preferred position maintains the tensioning mechanism in the tensioned configuration thereby precluding unintentional release and subsequent loosening of the seat connection to the vehicle.

It is a still further object of the present invention to provide a quick acting belt tensioning mechanism for securing a child safety seat into a vehicle that is durable in construction, inexpensive of manufacture, carefree of maintenance, easily assembled, and simple and effective to use.

These and other objects are achieved in accordance with the present invention by providing a quick acting belt tensioning mechanism for securing a child safety seat into a vehicle having a tensioning member with a hook-like engagement structure rotatably mounted on the safety seat adjacent to a belt path for a vehicle seat belt. The engagement structure includes a belt engagement path substantially surrounded by the structure and an engagement opening created by the open mouth of the hook. Engaging the seat belt in the engagement structure and rotating the tensioning member by movement of the lever tensions the seat belt by wrapping the seat belt around the tensioning member. The lever is slideably disposed on the tensioning member to close the engagement opening of the hook-like structure and trap the belt within the engagement path to prevent disengagement of the seat belt therefrom and to inhibit rotation of the tensioning member to the tensioned position unless the lever is properly positioned. A latching mechanism is provided to restrain the tensioning member and lever in the tensioned and closed position. The seat shell and lever may include structures to further constrain seat belt tensioning unless the lever is properly positioned.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

The advantages of this invention will be apparent upon consideration of the following detailed disclosure of the invention, especially when taken in conjunction with the accompanying drawings wherein.

Wherever possible, the same reference numbers will be used throughout the drawings to represent the same parts.

DETAILED DESCRIPTION OF THE INVENTION

Figure 1:
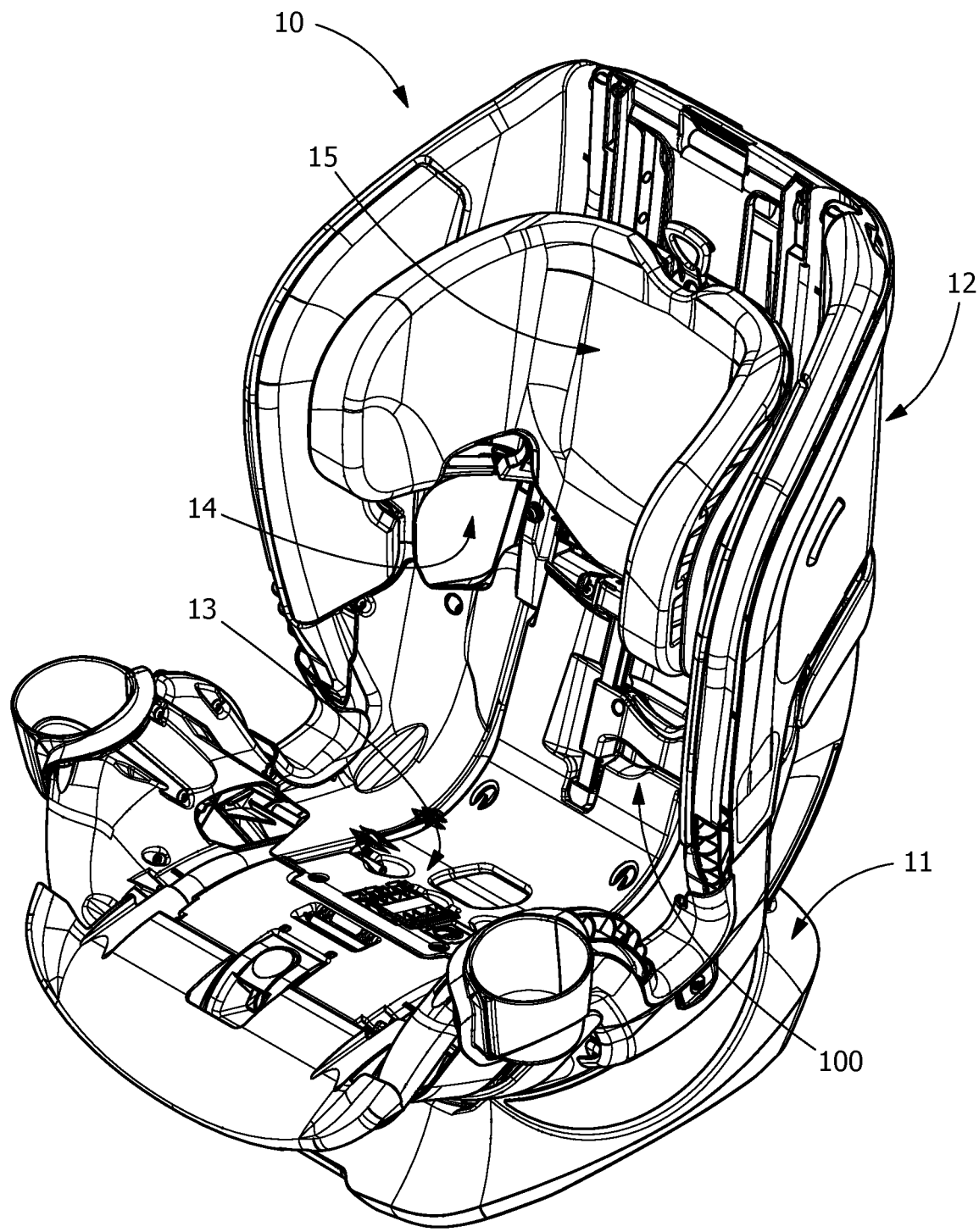
FIG. 1 is a perspective view of a child safety seat of the type in which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the seat would normally be positioned in a vehicle for use by a child. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Referring to the figures, an exemplary child safety seat 10 incorporating principles of the present invention is shown comprising a shell structure 12 configured to contain a child occupant therein and a base structure 11 suitable for resting upon a vehicle seat and support the shell structure. The shell structure includes a seating portion 13 and a backrest portion 15 that is angled in relation to the seating portion and extends generally upwardly therefrom. Shell structure 12 may be moveable in relation to base structure 11 to allow the recline angle of the shell structure and backrest portion to be adjusted for optimal orientation of the child occupant in relation to the vehicle seat when safety seat 10 is installed in a vehicle. Shell structure 12 may further be selectively detachable from base structure 11 allowing the shell structure to be used to carry a child occupant, typically an infant. A carry handle connected to the shell structure may be provided to that end.

Safety seats of the type illustrated are typically secured to the vehicle seat by directing the vehicle seat belt 20 through a belt pathway 14 formed in and defined by the shell structure. Directing the vehicle seat belt though the belt pathway and connecting the seat belt to a seat belt anchor connector provided in the vehicle on the laterally opposite side of the safety seat anchors the safety seat to the vehicle. Vehicle seat belt 20 may comprise a lap portion and a shoulder portion, or may comprise only a lap portion, and have a first end anchored to the vehicle and a second, free end that may be selectively anchored to the vehicle by a belt connector at a location distant from the first end belt anchor location so the belt extends across the lap and/or torso of a seat occupant. Some safety seats include a more substantial base structure that is anchored by the vehicle seat belts in the vehicle. The seat shell is subsequently connected to the base assembly. The connection of the shell structure to the base structure in such embodiments is more robust as it must withstand crash forces and maintain the seat shell securely connected to the base structure and hence the vehicle. The instant invention may also find utility in securing such base structures into vehicles.

Figure 2:
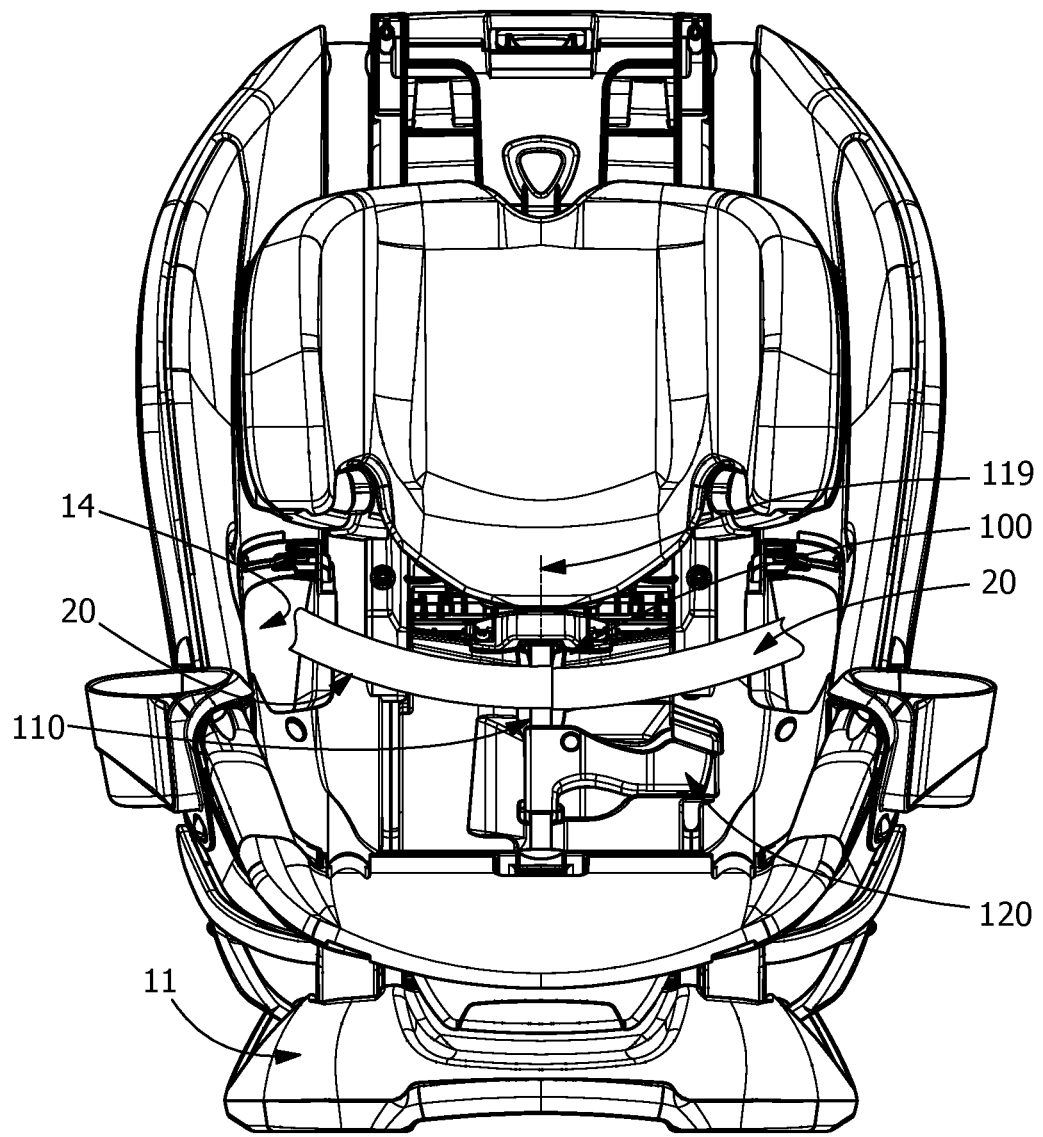
FIG. 2 is a front elevation view of the safety seat of FIG. 1 showing one embodiment of a quick acting belt tensioning mechanism as it would be positioned when in use securing the safety seat into the vehicle.
Figure 3:
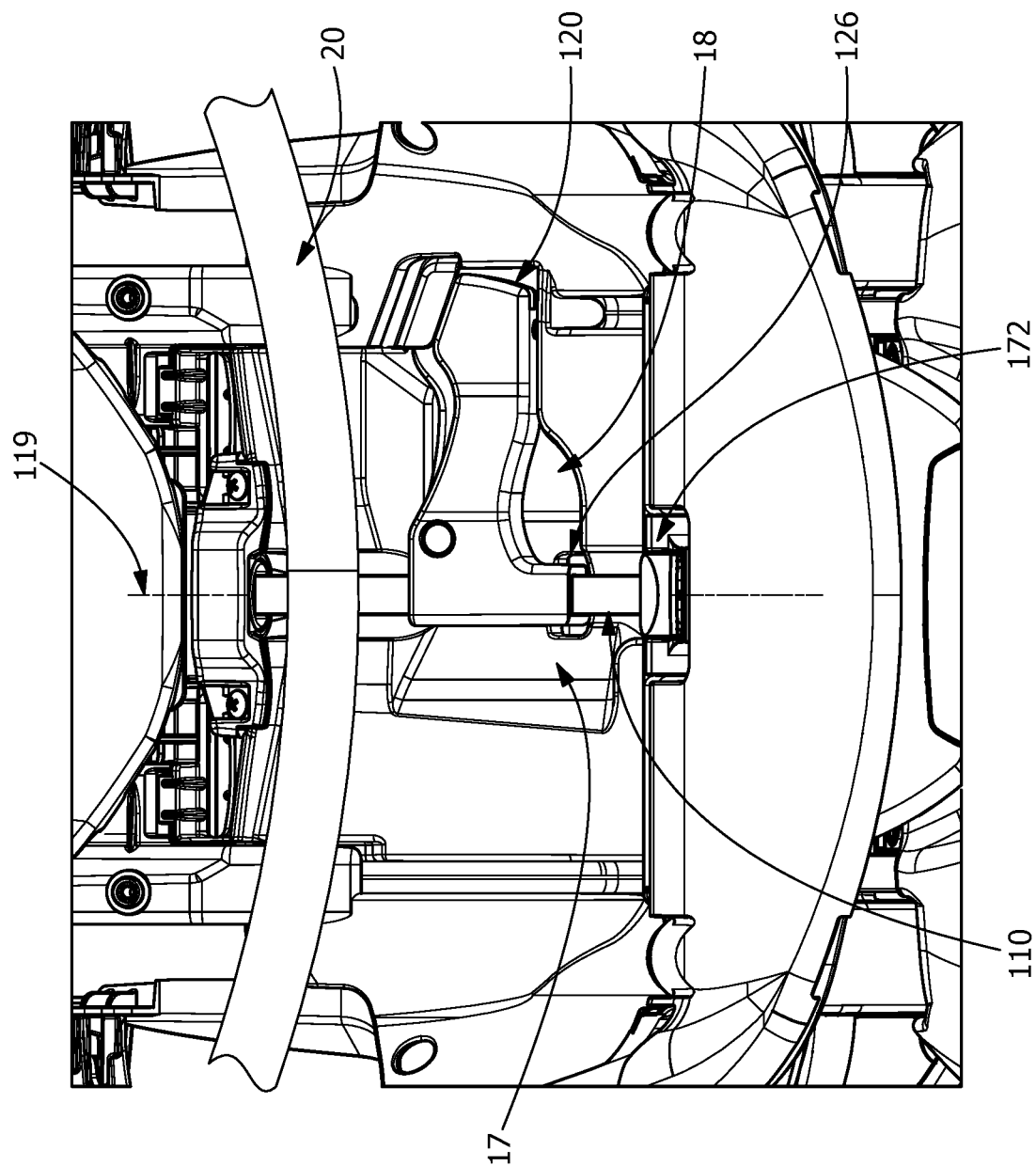
FIG. 3 is a partial view of the quick acting belt tensioning mechanism of FIG. 2 showing a latching mechanism in a released configuration in preparation for repositioning the belt tensioning mechanism to the released position.
Figure 4:
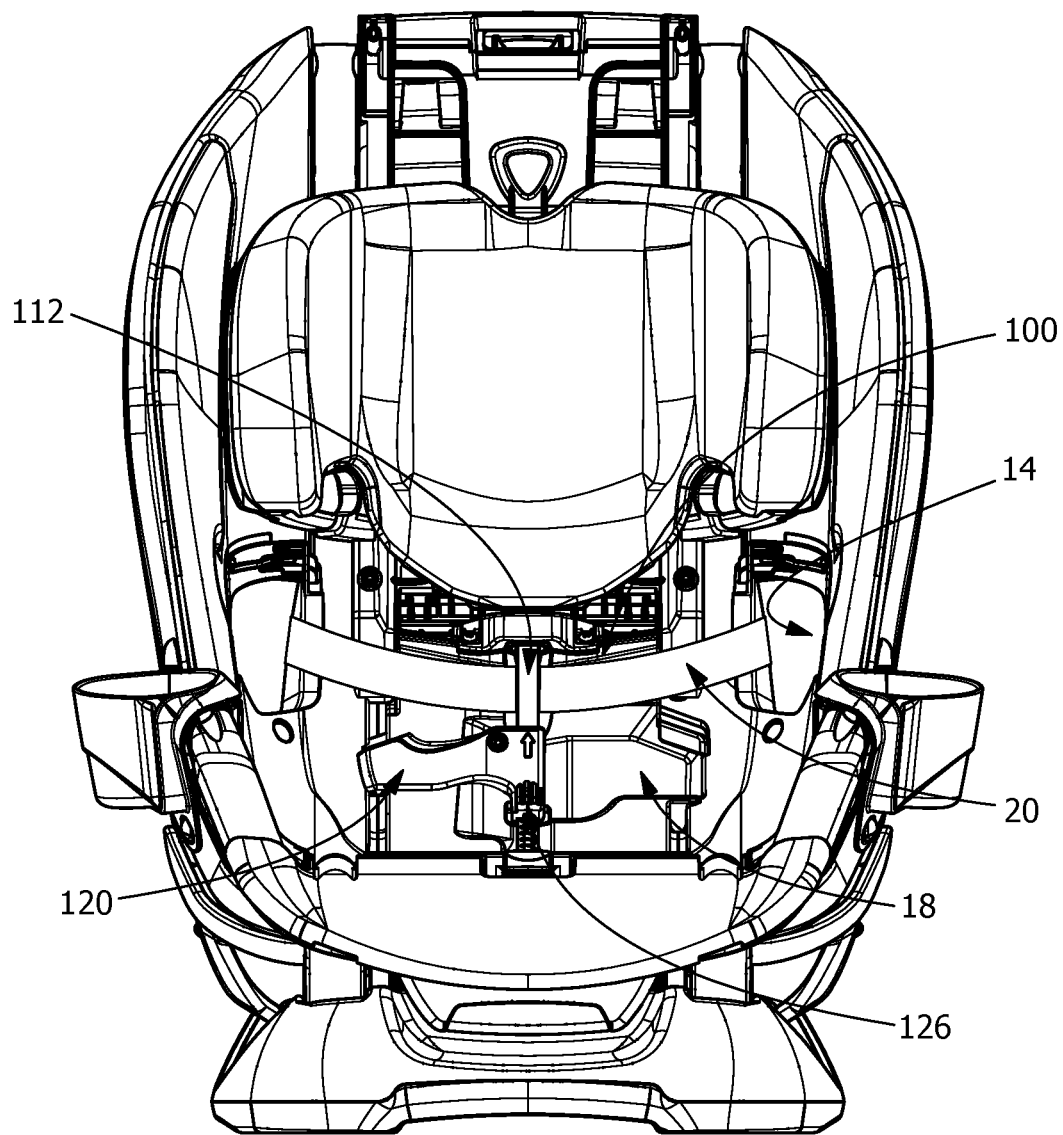
FIG. 4 is a front elevation view of the interior of the quick acting belt tensioning mechanism of FIG. 2 showing the mechanism in the released position.

The quick acting belt tensioning mechanism 100 comprises a tensioning member 110 with a hook-like belt engagement structure 112 disposed on the shell of the safety seat and rotatable about a rotational axis 119. The hook-like arrangement of belt engagement structure 112 defines a belt engagement path 113 through which vehicle seat belt 20 may pass when operably engaged and an engagement opening 114 which allows easy movement of belt 20 to laterally (in a direction parallel to rotational axis 119) into an operably engaged position wherein vehicle seat belt 20 passes through the belt engagement path 113 of the engagement structure 112. In the embodiment illustrated, rotational axis 119 is generally aligned parallel to the slope of the backrest portion and rotatable between generally opposing tensioned position (FIGS. 1-3) and released or detensioned position (FIG. 4-6).

Figure 5:
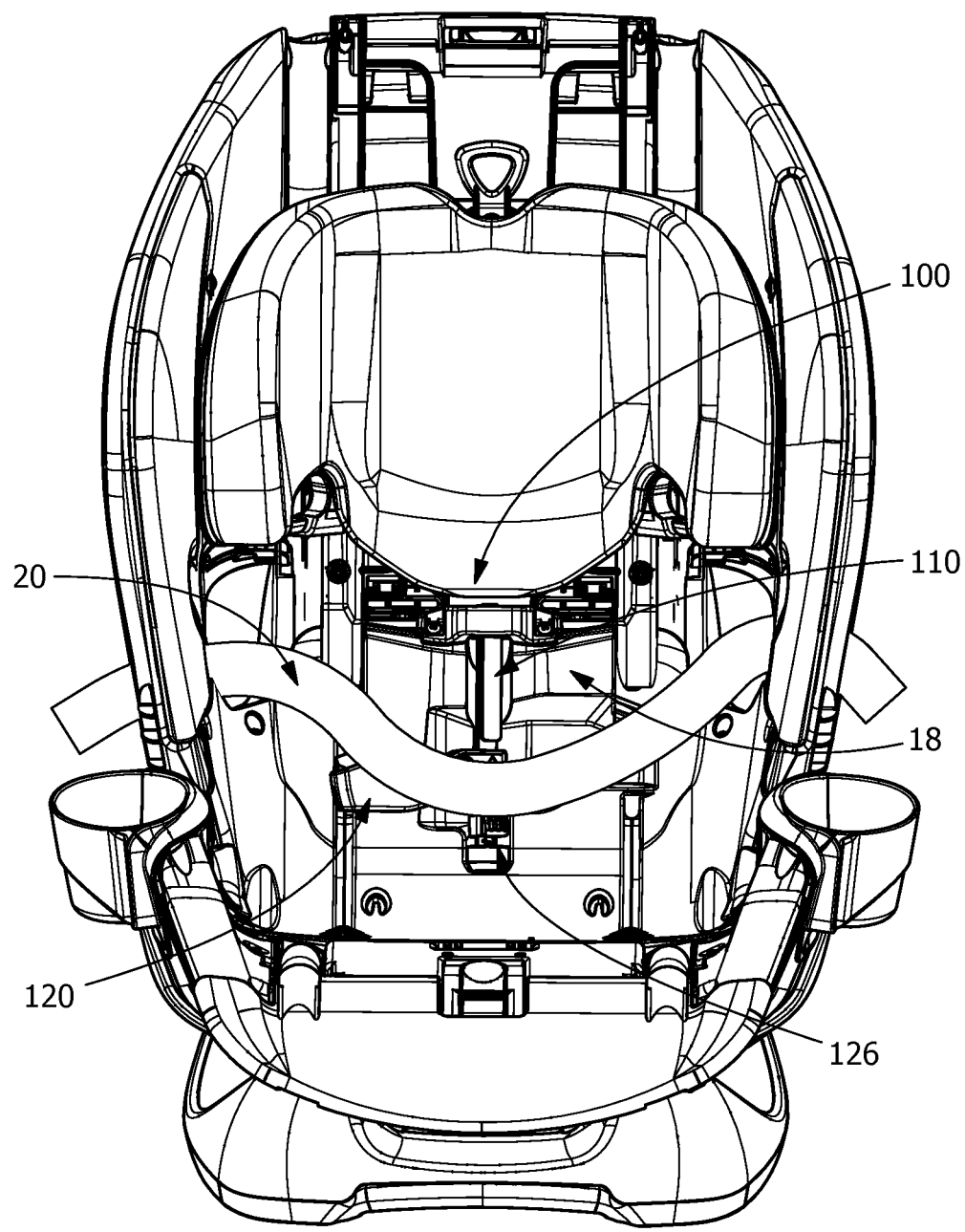
FIG. 5 is a front elevation view of the interior of the quick acting belt tensioning mechanism of FIG. 2 showing the mechanism in the release position and the operating lever in the open position to allow disengagement of the vehicle seat belt from the tensioning mechanism.
Figure 6:
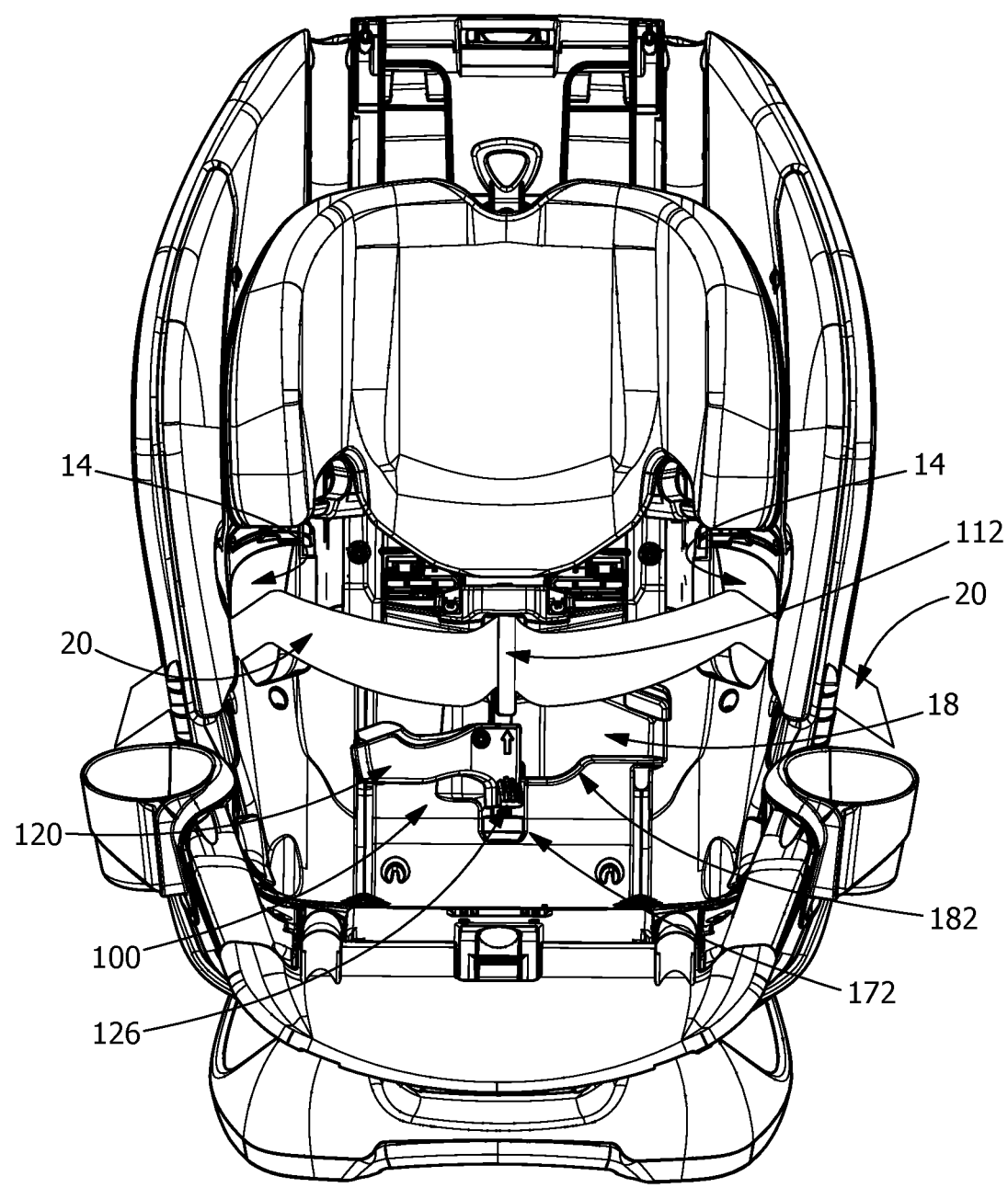
FIG. 6 is a front elevation view of the interior of the quick acting belt tensioning mechanism of FIG. 5 showing the routing of the vehicle seat belt engaged with the tensioning mechanism.
Figure 7:
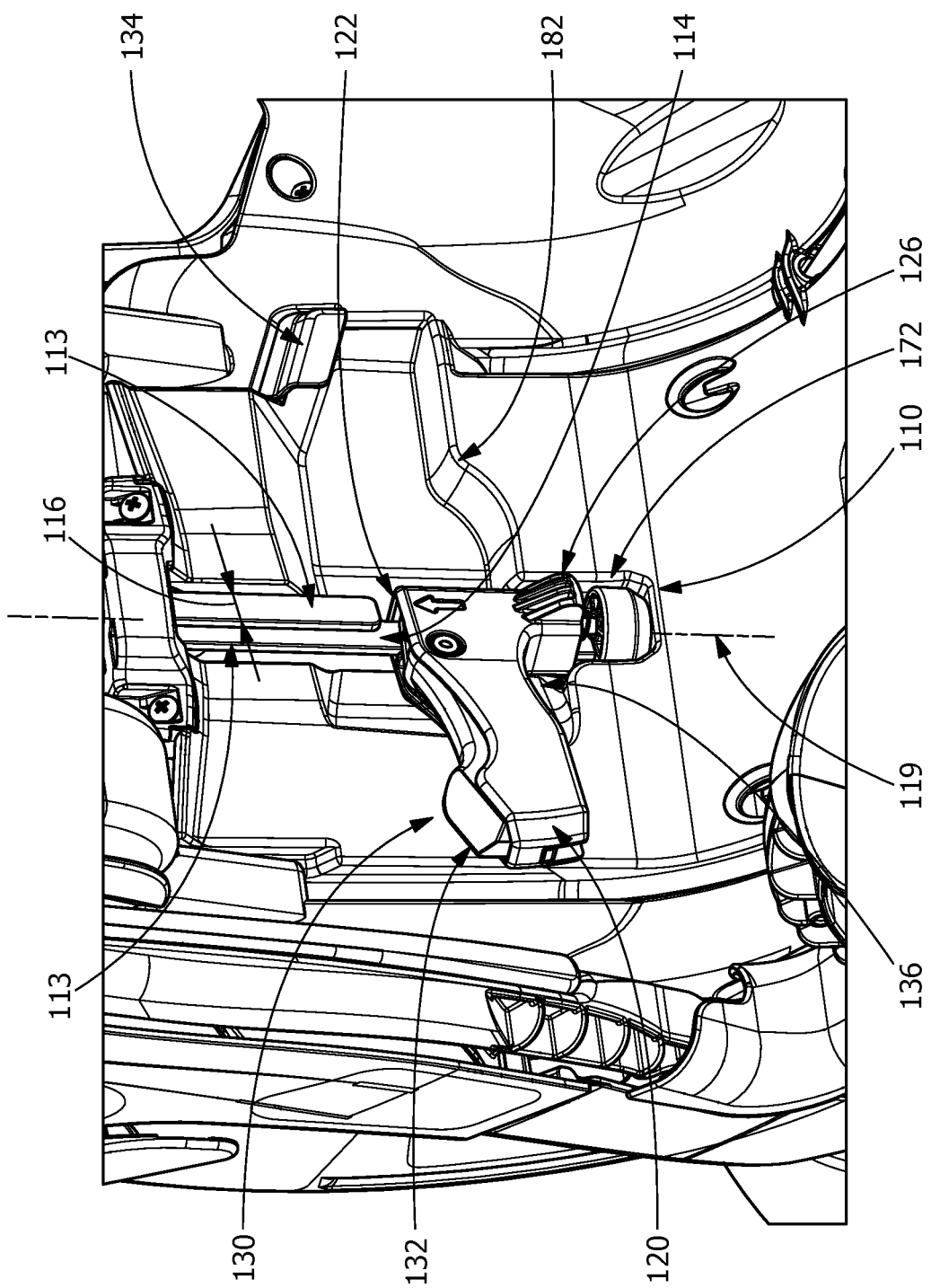
FIG. 7 is an expanded partial view of the belt tensioning mechanism as shown in FIG. 5 showing the seat shell and lever configurations used to limit mechanism movement.
Figure 8:
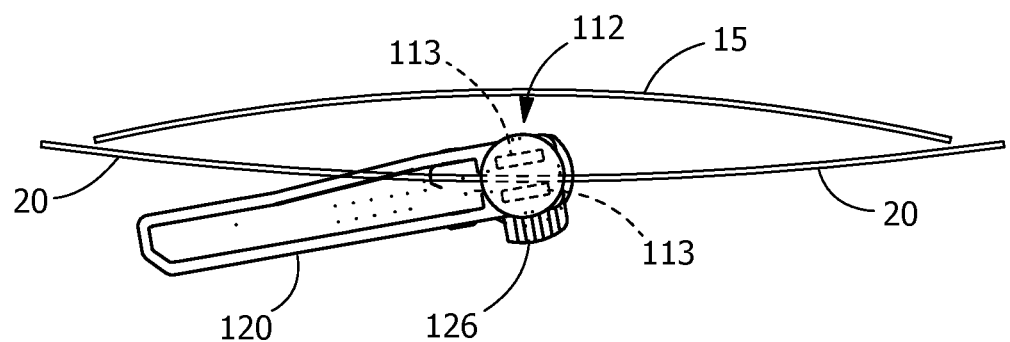
FIG. 8 is a partial view of the belt tensioning mechanism shown viewed from above and in the detensioned position.
Figure 9:
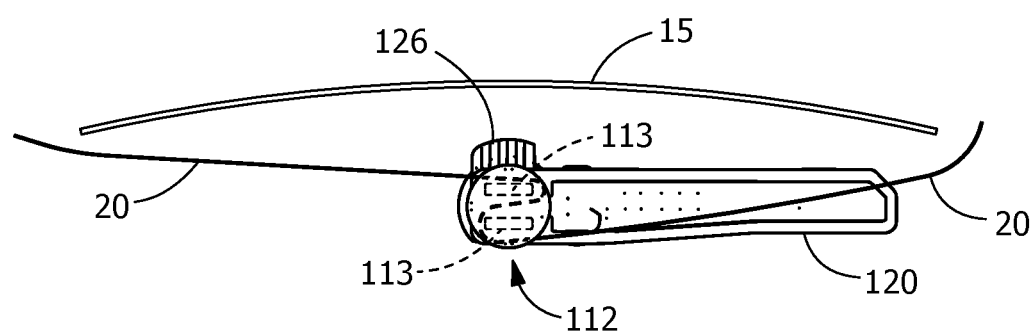
FIG. 9 is a partial view of the belt tensioning mechanism shown viewed from above and in the tensioned position.

The belt tensioning mechanism 100 further includes a lever 120 moveably disposed on engagement structure 112 and bi-directionally moveable in a direction parallel to the rotational axis between generally opposing open (FIG. 5)

and closed (FIG. 4) positions. Belt access to engagement opening 114 is uninhibited by lever 120 when the lever is in the open position. Sliding lever 120 (upwardly as illustrated) to the closed position blocks engagement opening 114 and prevents disengagement of the belt from belt engagement path 113 when passing therethrough. The shell structure includes a recessed portion 17 into which the belt tensioning mechanism is positioned so that soft goods covering the backrest portion provide a smooth surface for the child occupant. The recessed portion preferably includes a lever recess 18 configured to preclude lever movement toward the tensioned and latched orientation (FIG. 2) unless the lever is first moved to the closed position (FIG. 4). A lever block 126 may be provided on the lever to aid in limiting rotational movement of the lever when it is not in the fully closed position.

The lever 120 includes a sleeve 122 which engages tensioning member 110 in a manner enabling lever 120 to move bi-directionally along tensioning member 110 in line with rotational axis 119. The sleeve 122 is configured to engage tensioning member 110 in a manner enabling rotational torque to be applied to the tensioning member so that the tensioning member 110 may be rotated between the tensioned and detensioned positions. The sleeve 122 also allow bi-directional displacement of the lever in the direction of the rotational axis 119 between the open and closed positions. When shifted to the closed position, the sleeve encircles the engagement opening 114 portion of tensioning member engagement structure 112 (FIG. 4) to close the opening and trap the engaged vehicle seat belt therein.

Lever 120 movement is controlled by interaction with the seat shell structure 12. Lever 120 rotates about fixed rotational axis, but a blocking member 126 attached to lever 120 for movement therewith interacting with a blocking structure 172 to limit the axial locations along tensioning member 110 that lever 120 may be rotated. Blocking structure 172 is configured to inhibit lever 120 rotation toward the tensioned position unless lever 120 is moved upwardly into the closed position. Once so positioned, interference between blocking member 126 and blocking structure 172 no longer occurs, allowing the lever to be rotated. Similarly, lever 120 is inhibited from downward axial movement while in the tensioned position by interaction between the lever and/or blocking member and the blocking structure 172 and/or confines of lever recess 18, defined by peripheral end 182.

Moving lever 20 from a left pointing orientation (FIG. 4) to a right pointing orientation (FIG. 3) moves tensioning member 110 from the released position to the tensioned position, approximately one-half of a rotation of the tensioning member. The configuration of the recessed portion 17 of the backrest and the lever recess 18 may limit lever 120 rotation to slightly less than a one-half of a full rotation (180 degrees reversed) orientation of the lever. In the illustrated embodiment, the lever and tensioning member are limited to approximately 170 degrees of rotation between the tensioned and released positions due to the relationship between the lever and the recessed spaces. For purposes of this disclosure, approximately one-half rotation is defined as rotation of the tensioning member ranging between 160 degrees and 200 degrees.

A latching mechanism 130 is provided to maintain lever 120 in at least the tensioned position. Latching mechanism 130 may include a moveable latch member 132 engageable with a fixed latch member 134 when lever 120 is oriented in the tensioned position. The moveable latch member is moveable between generally opposing latched and unlatched positions. The moveable latch member may include a resilient member to bias the latch member toward the latched position and an actuator 136 to allow selective movement of the latch member toward the unlatched position. The latching mechanism is engaged when the lever and tensioning member are rotated to the tensioned position while the lever is in the closed position, the latch member being restrained by the fixed latch member to prevent reverse rotation of the tensioning member and lever out of the tensioned position. Moveable latch member 132 may be selectively moved to allow disengagement of the moveble latching member 132 from the fixed latch member 134 and movement of the lever and tensioning member from the tensioned position. The moveable latch member may be disposed on the lever and the fixed plate on the shell structure, or the relative positions may be reversed. The latch members may be reinforced to withstand anticipated forces and/or to improve operation of durability of the latching mechanism.

The engagement structure has a width 116 transverse to the rotational axis. As the tensioning member is rotated from the released to the tensioned position, the vehicle seat belt is wrapped around the tensioning member, reducing the effective belt length to effectively tension the seat belt. The width of the tensioning member may be varied during production to optimize the degree of belt tensioning applied to the seat belt by the belt tensioning mechanism.

The process of securing the safety seat into the vehicle requires positioning the seat in a desired position in the vehicle, preferably in a rear seat. The lap and shoulder portions of the vehicle seat belt 20 are directed through the belt pathway and connected to the seat belt latch on the opposite of the safety seat. When so installed, the vehicle seat belt passes adjacent to the belt tensioning mechanism 100. When the mechanism 100 is positioned as shown in FIG. 5. the seat belt may be directed through the engagement structure. The vehicle seat belt should be tightened to snug tight. The tensioning mechanism is operated by sliding the lever upwardly to the closed position as illustrated in the FIGS. 5 and 4. The lever is then moved to the opposite side which rotates the tensioning member from the released position to the tensioned position. Moving the lever fully to the tensioned position engages the latching mechanism to prevent reverse movement of the lever and tensioning member.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A belt tensioning mechanism for securing a child safety seat onto a vehicle seat, the safety seat having a seat shell with a belt pathway through which a vehicle seat belt may be directed to anchor the safety seat to the vehicle seat, the belt tensioning mechanism comprising:
a tensioning member moveably connected to the seat shell and partially disposed in the belt pathway, the tensioning member being rotatable between generally opposing tensioned and detensioned positions and further having a belt engagement structure into which a portion of the vehicle seat belt may be received; and
a lever operably connected to the tensioning member and configured to rotate the tensioning member from the detensioned to the tensioned position thereby enwrapping the vehicle seat belt engaged in the belt engagement structure around the tensioning member;
the lever being bi-directionally slidable axially along tensioning member between generally opposing open and closed positions, the lever preventing disengagement of the vehicle seat belt from the belt engagement structure when in the closed position.

2. The belt tensioning mechanism of claim 1, wherein the tensioning member further comprises a belt path and an engagement opening, the engagement opening configured to enable the portion of the vehicle seat belt to be received into the belt path when the lever is in the open position.

3. The belt tensioning mechanism of claim 2, wherein the tensioning member is rotated approximately one-half of a full revolution when moving between the detensioned and tensioned positions.

4. The belt tensioning mechanism of claim 2, further comprising a position limiter configured to inhibit rotation of the lever and tensioning member into the tensioned position unless the lever is in the closed position.

5. The belt tensioning mechanism of claim 4, wherein the position limiter is further configured to inhibit movement of the lever from the closed position toward the open position unless the lever and tensioning member are in the tensioned position, and to permit movement of the lever toward the open position as the lever and tensioning member are moved toward the detensioned position.

6. The belt tensioning mechanism of claim 5, wherein the position limiter includes a blocking member disposed on the lever and a blocking structure disposed on the seat shell, contact between the blocking structure and the blocking limiting the movement of the lever.

7. The belt tensioning mechanism of claim 1, further comprising a latching mechanism configured to restrain the tensioning mechanism in at least the tensioned position.

8. The belt tensioning mechanism of claim 7, wherein the latching mechanism comprises a selectively moveable latch member engagable with a fixed latch member, engagement of the moveable latch member with the fixed latch member restraining the lever in at least the tensioned position.

9. A belt tensioning mechanism for securing a child safety seat onto a vehicle seat, the safety seat having a seat shell defining a belt pathway through which a vehicle seat belt may be directed to anchor the safety seat to the vehicle seat, the belt tensioning mechanism comprising:
a tensioning member connected to the seat shell and partially disposed in the belt pathway, the tensioning member being rotatable about an axis between generally opposing tensioned and detensioned positions, the tensioning member having a hook-like belt engagement structure into which a portion of the vehicle seat belt may be received; and
a lever operably connected to the tensioning member and configured to rotate the tensioning member about the axis between the tensioned and detensioned positions, the lever being bi-directionally displacable along the axis between generally opposing open and closed positions;
wherein the vehicle seat belt may be received by the belt engagement structure through an opening into the belt engagement structure accessible by the seat belt only when the lever is in the open position, and, once engaged, sliding the lever to the closed position and rotating the lever to the tensioned position convolutes the vehicle seat belt path by wrapping the tensioning member to removing slack in the seat belt.

10. The belt tensioning mechanism of claim 9, further comprising a position limiter configured to inhibit rotation of the lever and tensioning member into the tensioned position unless the lever is in the closed position.

11. The belt tensioning mechanism of claim 10, wherein the position limiter is further configured to inhibit movement of the lever from the closed position toward the open position when the belt tensioning member is in the tensioned position, and to permit movement of the lever toward the open position as the belt tensioning member is moved toward the detensioned position.

12. The belt tensioning mechanism of claim 11, wherein the position limiter includes a blocking member disposed on the lever and a blocking structure configured in the seat shell, contact between the blocking structure and the blocking limiting the movement of the lever.

13. The belt tensioning mechanism of claim 9, further comprising a latching mechanism configured to restrain the tensioning mechanism in at least the tensioned position.

14. The belt tensioning mechanism of claim 13, wherein the latching mechanism comprises a selectively moveable latch member engagable with a fixed latch member, engagement of the moveable latch member with the fixed latch member restraining the lever in at least the tensioned position.

15. A method of securing a child safety seat onto a vehicle seat comprising the steps of:
providing a belt tensioning mechanism comprising a rotatable tensioning member with a belt engagement structure, and a lever operably connected to tensioning member;
positioning the safety seat onto the vehicle seat, extending a vehicle seat belt though a belt pathway defined by the safety seat, and securing a free end of the vehicle seat belt to a vehicle seat belt anchor;
positioning the belt tensioning mechanism in a detensioned position;
engaging the vehicle seat belt in an opening in the belt engagement structure, the opening accessible to receive the vehicle seat belt only when the lever is in an open position;

shifting the lever from the open position to a closed position, the closed position configured to prevent disengagement of the vehicle seat belt from the belt engagement structure; and rotating the belt engagement structure from the detensioned position to a tensioned position using the lever thereby convoluting the vehicle seat belt to removing slack in the seat belt and secure the child safety to the vehicle seat.

16. The method of claim 15, wherein the tensioning member is rotated approximately one-half of a full revolution when moving between the detensioned and tensioned positions.

17. The method of claim 15, wherein the lever is bi-directionally slideable along an axis of rotation between the open and closed positions.

\* \* \* \* \*